United States Patent [19]
Yoshizawa

[11] Patent Number: 5,828,925
[45] Date of Patent: Oct. 27, 1998

[54] IMAGE FORMING APPARATUS CAPABLE OF CORRECTING POSITION DEVIATION OF IMAGE

[75] Inventor: Atsutomo Yoshizawa, Kawasaki, Japan

[73] Assignee: Canon Kabushiki Kaisha, Tokyo, Japan

[21] Appl. No.: 820,239

[22] Filed: Mar. 18, 1997

Related U.S. Application Data

[63] Continuation of Ser. No. 621,974, Mar. 26, 1996, abandoned.

[30] Foreign Application Priority Data

Mar. 31, 1995 [JP] Japan ................................ 7-076251
Mar. 11, 1996 [JP] Japan ................................ 8-053077

[51] Int. Cl.⁶ .................... G03G 15/01; G03G 15/04; G06F 15/62
[52] U.S. Cl. ...................... 399/39; 347/116; 399/394
[58] Field of Search ................ 399/46, 51, 76, 399/85, 165, 39, 394, 395, 396; 347/116, 248, 234, 129, 223

[56] References Cited

U.S. PATENT DOCUMENTS

| | | | |
|---|---|---|---|
| 4,937,664 | 6/1990 | Chiku et al. | 355/327 X |
| 5,212,504 | 5/1993 | Takada et al. | 355/208 X |
| 5,272,492 | 12/1993 | Castelli | 347/116 |
| 5,587,771 | 12/1996 | Mori et al. | 347/116 X |

Primary Examiner—Arthur T. Grimley
Assistant Examiner—Sophia S. Chen
Attorney, Agent, or Firm—Fitzpatrick, Cella, Harper & Scinto

[57] ABSTRACT

A sensor for measuring a temperature of a portion near an exposing unit to expose a photosensitive drum and a sensor for measuring a temperature in an apparatus other than the exposing unit are provided, thereby controlling a registration correction operation in accordance with a difference between outputs of those sensors. Thus, the registration correction operation can be always executed at the optimum timing and a good image can be continuously formed.

36 Claims, 14 Drawing Sheets

IMAGE FORMING APPARATUS CAPABLE OF CORRECTING POSITION DEVIATION OF IMAGE

This application is a continuation of application Ser. No. 08/621,974 filed Mar. 26, 1996, now abandoned.

BACKGROUND OF THE INVENTION

1. Field of the Invention

The invention relates to an image forming apparatus and, more particularly, to an apparatus having a correcting function of a position deviation of an image.

2. Related Background Art

As such a kind of apparatus, an apparatus for forming a color image by using a laser beam is known. FIG. 1 is a diagram showing a construction of a main section of such a kind of apparatus.

In the diagram, a laser beam irradiated from a laser light source, which will be explained hereinlater, is scanned in bidirections by a rotary polygon mirror 103 which is rotated in the direction shown by an arrow in the diagram and passes through an fθ lens (which will be explained hereinlater) corresponding to each of cyan (C), magenta (M), yellow (Y), and black (BK). By scanning lines 102C, 102M, 102Y, and 102BK which passed through the fθ lenses (described later), images are formed on photosensitive drums 101C, 101M, 101Y, and 101BK which are rotated in the direction shown by an arrow in the diagram, respectively. The images are multiplexingly transferred onto a transfer material 105 which is conveyed in the direction shown by an arrow X in the diagram, so that a multiplexed image is formed. Reference numeral 13 denotes a transfer belt; 31 a transfer belt driving roller; 6C to 8C, 6M to 8M, 6Y to 8Y, and 6BK to 8BK reflecting mirrors (hereinafter, simply referred to as "mirrors").

In the apparatus having a plurality of image forming stations as mentioned above, the images of different colors are sequentially transferred onto the same surface of the same transfer material 105. Therefore, when a transfer image position in each image forming station is deviated from an ideal position, for example, in case of a multi-color image, such a deviation appears as an image interval deviation or overlap of the different colors. In case of a color image, such a deviation appears as a difference of color tones or, further, as a color deviation in a worse case, causing a quality of the image to be remarkably deteriorated.

FIGS. 2A to 2D are diagrams for explaining the kinds of position deviation of transfer images of the image forming apparatus shown in FIG. 1.

As kinds of position deviation of the transfer images, as shown in FIGS. 2A to 2D, there are the following kinds: namely, a position deviation (top margin) in the scanning line writing (sub-scanning) direction (in the direction shown by an arrow A in the diagram) (refer to FIG. 2A); a position deviation (left margin) in the main scanning direction (B direction which is perpendicular to the A direction in the diagram) (refer to FIG. 2B); an inclination deviation in the oblique direction (refer to FIG. 2C); a magnification error deviation (refer to FIG. 2D); and the like. Actually, a deviation in which the above four kinds of deviations are multiplexed appears. Causes of the occurrence of the above deviations will now be explained hereinbelow.

FIG. 3 is a plan view of an exposing section of the multiplexed image forming apparatus shown in FIG. 1. The scanning lines 102M and 102Y on the photosensitive drums 101M and 101Y in FIG. 1 are developed on the same plane and shown. The scanning lines 102C and 102BK are omitted because they are shown as same images as the scanning lines 102M and 102Y on the plane.

In FIG. 3, reference numeral 401 denotes a lens supporting plate as an optical base plate on which an optical system in either one of the bidirections (the direction in which the drums M and C are provided and the direction in which the drums of Y and BK are arranged). Laser light sources 402C and 402M of cyan and magenta, an fθ lens 403, and the like are attached to the lens supporting plate 401. Reference numeral 404 denotes a lens supporting plate as an optical base plate on which an optical system of another one of the bidirections is arranged. Laser light sources 402Y and 402BK of yellow and black, an fθ lens 405, and the like are attached to the lens supporting plate 404. The lens supporting plates 401 and 404 are held to a base plate 406 as a supporting plate together with a motor casing 415 in which the rotary polygon mirror 103 is enclosed and which is formed by a metal such as aluminum or the like. The base plate 406 is positioned to an apparatus main body 407 and is attached thereto by three screws 410.

The optical systems of two systems in the bidirections are arranged in a manner such that optical center axes 411 and 412 of the optical systems, namely, the fθ lenses 403 and 405 coincide with optical centers 413 and 414 in the bidirections at a reflecting surface of the rotary polygon mirror 103, respectively. The lens supporting plates 401 and 404 can be rotated in the same plane in the directions shown by arrows a around the optical centers 413 and 414 as rotational centers. After a variable magnification of each of scanning lines 422M and 422Y was adjusted, the lens supporting plates 401 and 404 are fixed to the base plate 406 at arbitrary positions by three screws 409C and three screws 409Y, respectively.

In such a construction, when the apparatus is moved, the rotary polygon mirror 103 in the motor casing 415 is rotated at a high speed by a motor (not shown).

Further, currents are supplied to laser drivers 408C, 408M, 408Y, and 408BK as electric boards for flicking the laser light sources 402C, 402M, 402Y, and 402BK. The motors and laser drivers are heat generating sources and overheat the lens supporting plates 401 and 404 and the base plate 406, thereby raising their temperatures.

However, since a temperature gradient occurs between the temperatures at a position near the heat generating sources and a position away therefrom, an exposing section is not uniformly extended. Thus, deviations, namely, warps in the vertical direction occur in the lens supporting plates 401 and 404 and base plate 406. When such warps occur, a scanning position of the scanning line on the photosensitive drum changes, so that a scanning precision deteriorates. A step of such a deterioration will now be described hereinbelow with reference to FIGS. 4A and 4B.

FIGS. 4A and 4B are cross sectional views of main sections for explaining a construction around the rotary polygon mirror 103 shown in FIG. 3.

To simplify the explanation, it is now assumed that the base plate 406 doesn't change and only the lens supporting plate 401 changes.

In FIG. 4A, as mentioned above, in the lens supporting plate 401, the fixed position by a screw 409 is not moved but a portion near the center is curved in the vertical direction, namely, Z direction. When the lens supporting plate 401 is curved, a laser attaching portion around the lens supporting plate 401 is also deformed. The irradiating direction of the laser beam changes and the reflecting position of the laser beam at the rotary polygon mirror 103 changes from a position (1) to a position (2). When the reflecting position at the rotary polygon mirror 103 changes to the position (2), as shown in FIG. 4B, the scanning position changes from a position (3) to a position (4).

When the scanning position changes as mentioned above, an image writing position changes and a curve of the scanning line also increases. In a color printer for obtaining a color image by repetitively scanning a plurality of laser beams, those changes appear in the image as a color deviation and a change in color tone, causing an image quality to remarkably deteriorate.

FIG. 5 is a schematic cross sectional view for explaining the laser scanning system of the image forming apparatus shown in FIG. 1. FIG. 6 is a cross sectional view of the main section showing the photosensitive drums 101C, 101M, 101Y, and 101BK shown in FIG. 5 and a deviation of an image transfer position.

In the image forming apparatus constructed as shown in FIG. 5, when a temperature of each portion in the apparatus rises due to the use of the apparatus, a diameter of the transfer belt driving roller 31 increases in accordance with a coefficient of linear expansion, a diameter, and a temperature rise amount of a material. Since the transfer belt driving roller 31 is rotating at a constant angular velocity, a moving velocity v of the transfer belt 13 increases by only Δv. Namely, the transfer belt 13 moves at a velocity of (v+Δv). Thus, a top margin changes as shown in FIG. 6.

As shown in FIG. 6, the photosensitive drums 101C, 101M, 101Y, and 101BK are arranged at regular intervals. In this case, so long as the moving velocity of the transfer belt 13 is a normal moving velocity, each image of the other stations ought to be overlapped to a position C on the photosensitive drum 101C at which the image is transferred to the transfer material 105. However, since the velocity of the transfer belt 13 is so fast, the image is transferred to a position M which is delayed than the position C on the photosensitive drum 101M.

Similarly, the images of Y and BK on the photosensitive drums 101Y and 101BK are also transferred to positions Y and BK which are delayed as shown in the diagram. Namely, a top margin deviation of a delay level (plus level) occurs. When the temperature of each portion rises in association with the use of the apparatus, a position of a side plate supporting a photosensitive drum axis also changes as shown in FIGS. 11A to 11C in accordance with a coefficient of linear expansion, dimensions, and a temperature rise amount of a material of the side plate.

FIG. 7 is a cross sectional view of the main sections showing the photosensitive drums 101C, 101M, 101Y, and 101BK shown in FIG. 5 and a deviation of the image transfer position.

As shown in the diagram, when a temperature of each section rises in association with the use of the apparatus, the position of the side plate supporting the photosensitive drum axis also changes in accordance with a linear expansion coefficient, dimensions, and a temperature rise amount of its material. For example, when considering by setting the photosensitive drum 101C to a reference, position change amounts (ΔL, 2ΔL, 3ΔL) increase in accordance with the order of the photosensitive drums 101C, 101M, 110Y, and 101BK. Since the transfer material 105 moves at the constant velocity v, as for the images to be transferred, the transfer positions M, Y, and BK are made earlier than the position C, so that a top margin deviation of an advance level (minus level) occurs.

When the side plate of the casing thermally expands in a manner similar to the above, the position of the reflecting mirror supported by the side plate also changes as shown in FIG. 8.

FIGS. 8 and 9 are cross sectional views of main sections showing the photosensitive drums 101C, 101M, 101Y, and 101BK shown in FIG. 5 and a deviation of the image transfer position.

As shown in the diagram, when the side plate of the apparatus casing thermally expands in a manner similar to the above, for example, when considering by setting the photosensitive drum 101C to a reference, since the mirror positions of all of the stations change in an x direction (paper conveying direction), an optical path length changes. A change amount is determined by a distance from the photosensitive drum 101C and is not constant.

Further, when the side plate of the apparatus casing thermally expands in a manner similar to the above, for example, when the position changes in a direction perpendicular to the paper conveying direction (direction perpendicular to the paper conveying direction), the positions of the mirrors change. Therefore, the optical path length and the laser beam irradiating positions onto the photosensitive drums 101C, 101M, 101Y, and 101BK change, so that a magnification deviation and a top margin deviation occur. Actually, since a deviation amount of the top margin at a position before the apparatus is not equal to that after the apparatus, an inclination deviation and a left margin deviation also occur.

The following method is considered in order to correct the four kinds of deviations described above.

FIG. 10 is a schematic perspective view of the main section for explaining a registration correcting mechanism of such a kind of image forming apparatus. FIGS. 11A to 11C are diagrams for explaining a registration correction state which is corrected by the registration correcting mechanism shown in FIG. 10.

With respect to the top margin and left margin, the deviation amounts are corrected by electrically adjusting the scanning timings of the scanning lines 102C, 102M, 102Y, and 102BK. For the magnification error deviation and the inclination deviation, mirrors 6 and 7 among returning mirrors arranged in the middle of an optical path of each station are perpendicularly arranged to thereby form one pair of mirrors having an almost "/ \" shape. As shown in FIG. 14, by individually independently adjusting such a mirror pair in the directions shown by arrows E and F for the apparatus main body, thereby enabling the deviation amounts to be corrected.

As adjusting means for adjusting the deviation amounts, actuators 27 to 29 such as linear step actuators or the like having step motors as driving sources for linearly moving the mirror pair step by step are provided. By moving the actuator 27 in almost parallel in the direction shown by an arrow E1 in FIG. 10, by reducing the optical path lengths to the photosensitive drums 101C, 101M, 110Y, and 101BK, and by driving the actuator 27 in the direction shown by an arrow E2 in FIG. 10, the optical path lengths can be adjusted to long lengths.

By adjusting the optical path lengths as mentioned above, the lengths on the photosensitive drums 10C, 101M, 110Y, and 101BK of the scanning lines 102C, 102M, 102Y, and 102BK each having a predetermined spread angle can be changed, for example, from a scanning line m0 to a scanning line m1 as shown in FIG. 11A.

By simultaneously driving the actuators 28 and 29 in the same direction, for example, in the direction shown by an arrow F2 in FIG. 11B, the pair of mirrors 6 and 7 are moved in parallel in the F direction as a direction that is almost perpendicular to the above E direction. Thus, the scanning line m0 shown in FIG. 11B can be moved to a position of a scanning line m2.

In the case where either one of the actuators 28 and 29 is moved or in the case where driving forces in the opposite directions are given so as to move the actuator 28 in the direction shown by an arrow F1 and to move the actuator 29 in the direction shown by the arrow F2, an inclination angle of the scanning line m0 in FIG. 11C can be changed like a scanning line m3.

As described above, the mirrors 6 and 7 formed by almost perpendicularly assembling a pair of mirrors are arranged into the optical paths of the scanning lines 102C, 102M, 102Y, and 102BK from the scanning optical apparatus to the photosensitive drums 10C, 101M; 101Y, and 101BK. The positions of the pair of mirrors 6 and 7 are adjusted by the actuator 27 or the actuators 28 and 29. Thus, the optical path lengths or the scanning positions of the scanning lines 102C, 102M, 102Y, and 102BK can be independently adjusted, respectively.

That is, by moving the pair of mirrors 6 and 7 arranged in a "/\" shape in the E direction, only the optical path lengths of the scanning lines 102C, 102M, 102Y, and 102BK can be corrected without changing the positions of the scanning lines 102C, 102M, 102Y, and 102BK formed as images on the photosensitive drums 101C, 10M, 110Y, and 101BK. By moving the pair of mirrors 6 and 7 in the F direction, on the other hand, the image forming positions (top margins) on the photosensitive drums 101C, 10M, 101Y, and 101BK and their angles can be corrected without changing the optical path lengths of the scanning lines 102C, 102M, 102Y, and 102BK.

As mentioned above, although the above kind of image forming apparatus has the correcting function of the position deviations of the images due to the deviations of the scanning lines. However, when executing the correction, a registration mark is ordinarily formed to the transfer belt 13 and is read out by a CCD image sensor. A deviation amount from the specified position of each registration mark is calculated. A position deviation of the image is corrected on the basis of the calculated deviation amount.

While the correction operation is being executed, therefore, an image forming sequence has to be stopped. There is a problem such that if the registration correction is performed while ignoring the deviation characteristics due to the heat source including the above scanner system and the peripheral expansion and the like, the number of correcting times contrarily increases, a vain waiting time is given to the user, and images without a color deviation cannot be continuously formed.

SUMMARY OF THE INVENTION

It is an object of the invention to solve the problems as mentioned above.

Another object of the invention is to enable a correction operation of a position deviation of an image to be executed at an optimum timing.

Under such objects, according to an embodiment of the invention, there is provided an image forming apparatus comprising: (a) image forming means which has an image holding member and forms an image onto a recording medium; (b) exposing means for exposing the image holding member; (c) correcting means for correcting a position of the image which is formed on the recording medium by the image forming means; (d) first detecting means for detecting a temperature of a portion near the exposing means; (e) second detecting means for detecting a temperature of a portion in the apparatus other than the exposing means; and (f) control means for controlling the correction operation of the correcting means in accordance with outputs of the first and second detecting means.

Further another object of the invention is to enable images without a position deviation to be continuously formed by setting the number of executing times of a position deviation correction operation to a necessary minimum value.

Under such an object, according to an embodiment of the invention, there is provided an image forming apparatus comprising: (a) image forming means for forming an image onto a recording medium; and (b) correcting means for correcting a position of the image which is formed on the recording medium, wherein the correcting means has a first mode for executing the correction operation at a predetermined interval which sequentially changes and a second mode for executing the correction operation every predetermined time.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described hereinbelow.

Figure 1:
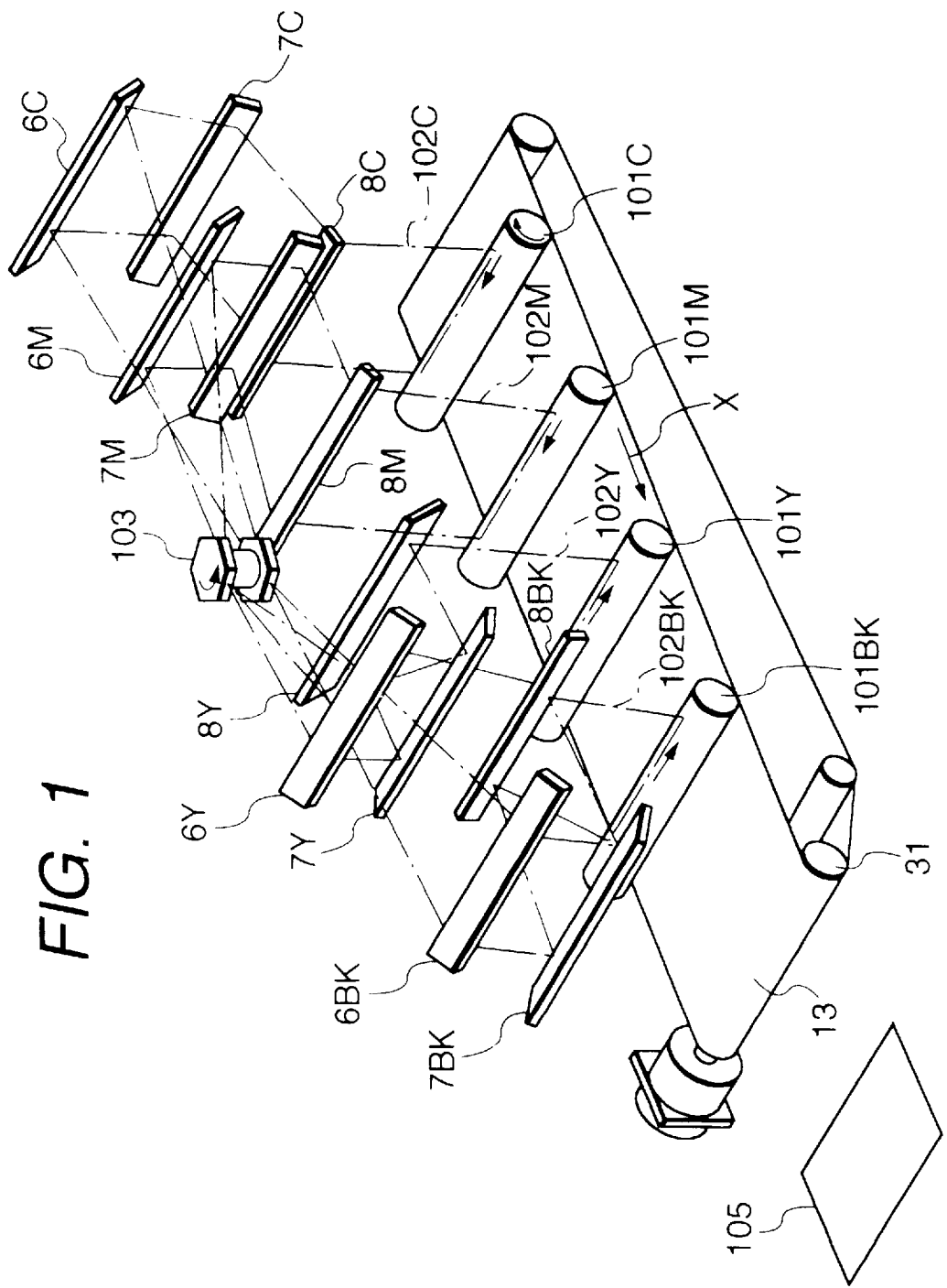
FIG. 1 is a schematic perspective view for explaining a construction of such a kind of image forming apparatus.
Figure 2A:
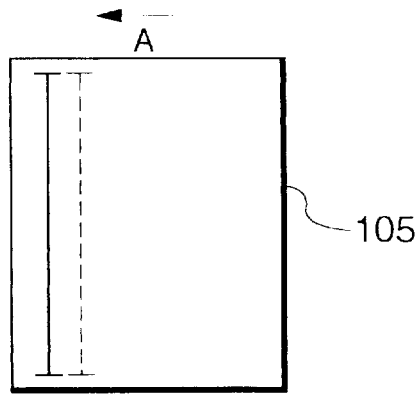
FIGS. 2A to 2D are diagrams for explaining kinds of position deviation of a transfer image of the image forming apparatus shown in FIG. 1.
Figure 2B:
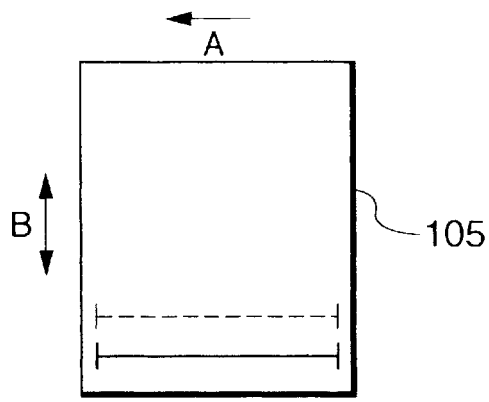
Figure 2C:
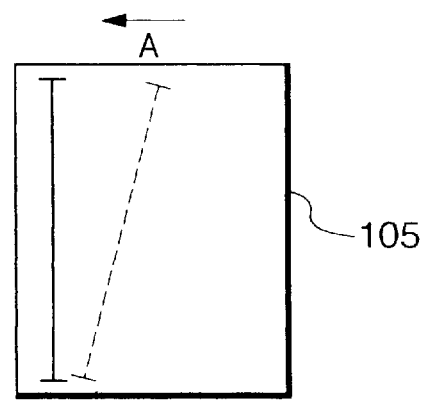
Figure 2D:
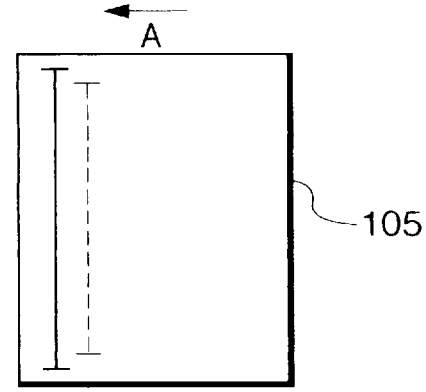
Figure 12:
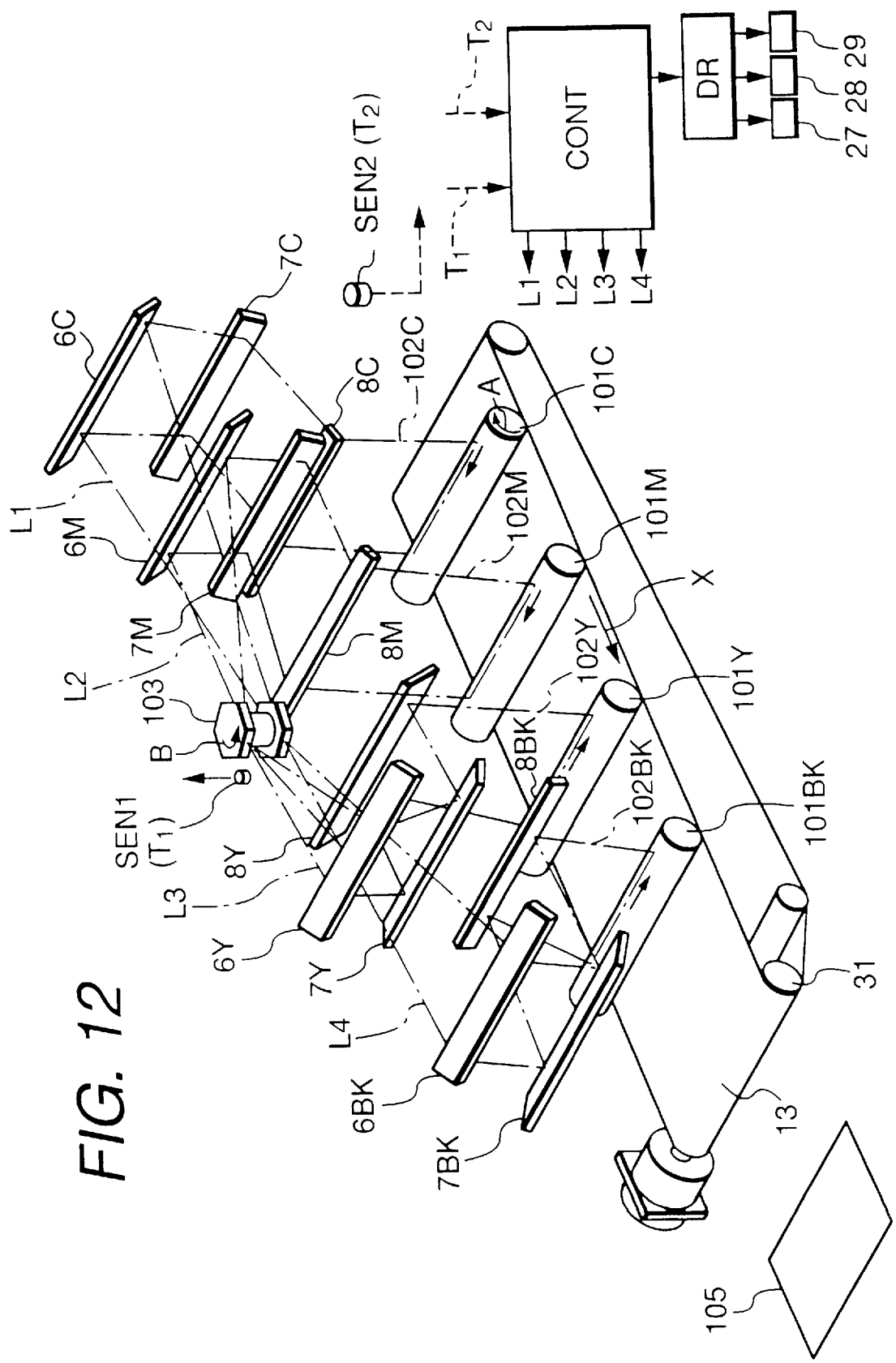
FIG. 12 is a schematic perspective view for explaining a construction of an image forming apparatus showing an embodiment of the invention.
Figure 13:
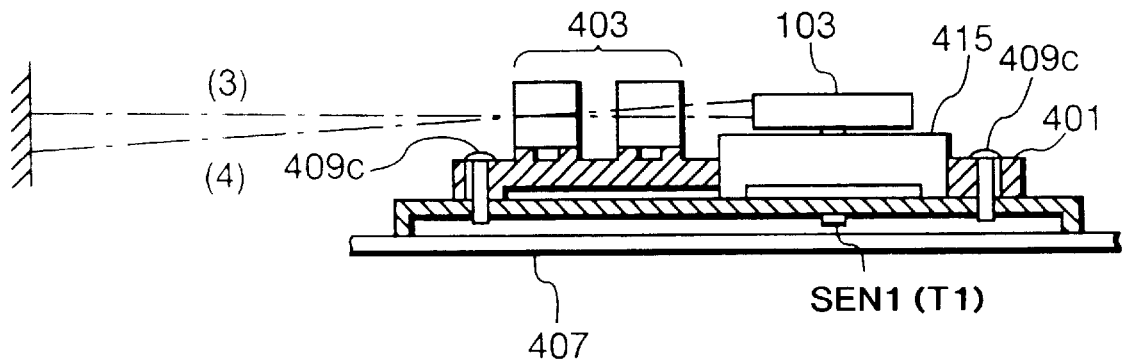
FIG. 13 is a cross sectional view of a main section of an exposing section shown in FIG. 12.

FIG. 12 is a schematic perspective view for explaining a construction of an image forming apparatus showing an embodiment of the invention. FIG. 13 is a cross sectional view of a main section of an exposing section shown in FIG. 12. Component elements having constructions similar to those in FIG. 1 are designated by the same reference numerals.

In those diagrams, SEN1 and SEN2 denote temperature sensors constructed by thermistors or the like. The temperature sensor SEN1 is arranged near a rotary polygon mirror driving motor as a maximum heat generating source and detects an exposing section temperature (temperature) T1. Specifically speaking, the sensor SEN1 measures a temperature of the casing 415 in the embodiment. Temperature data of the measured temperature is taken through an A/D converting section (not shown) of a controller section CONT. The controller section CONT has a CPU, an RAM, and an ROM (which are not shown) and integratedly controls each section. Namely, transmission timings of an enable signal to decide a scanning region of a laser beam in each image forming station are controlled by control signals L1 to L4. The actuators 27 to 29 shown in FIG. 10 and provided in the respective stations are controlled by a driver.

Figure 5:
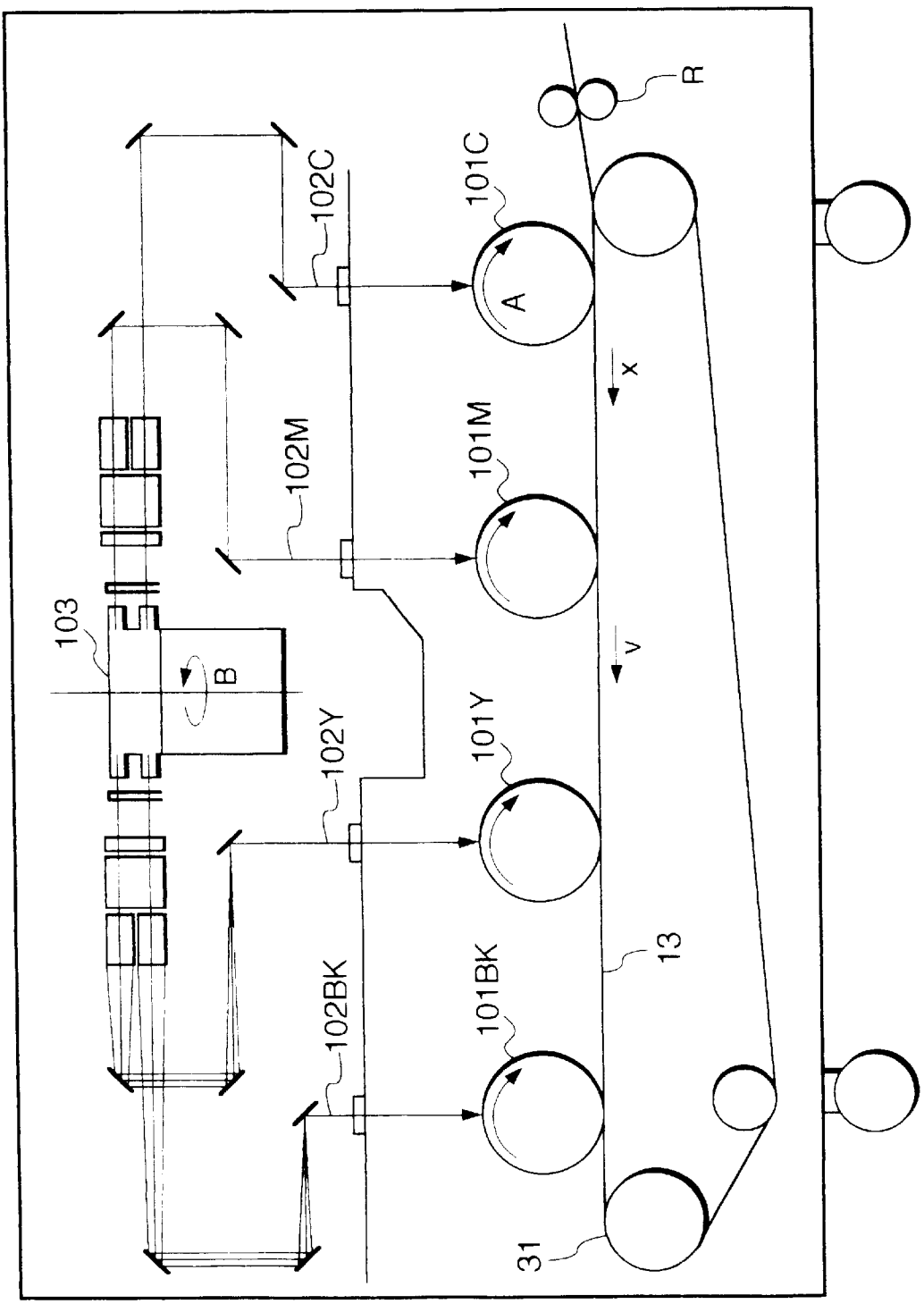
FIG. 5 is a schematic cross sectional view for explaining a laser scanning system of the image forming apparatus shown in FIG. 1.

The temperature sensor SEN2 is arranged at a position where a heat generating source in the apparatus is relatively small (for example, on a resist roller R in FIG. 5) and detects an internal temperature (temperature) T2. Temperature data of the detected temperature is taken through the A/D converting section (not shown) of the controller section CONT.

Figure 10:
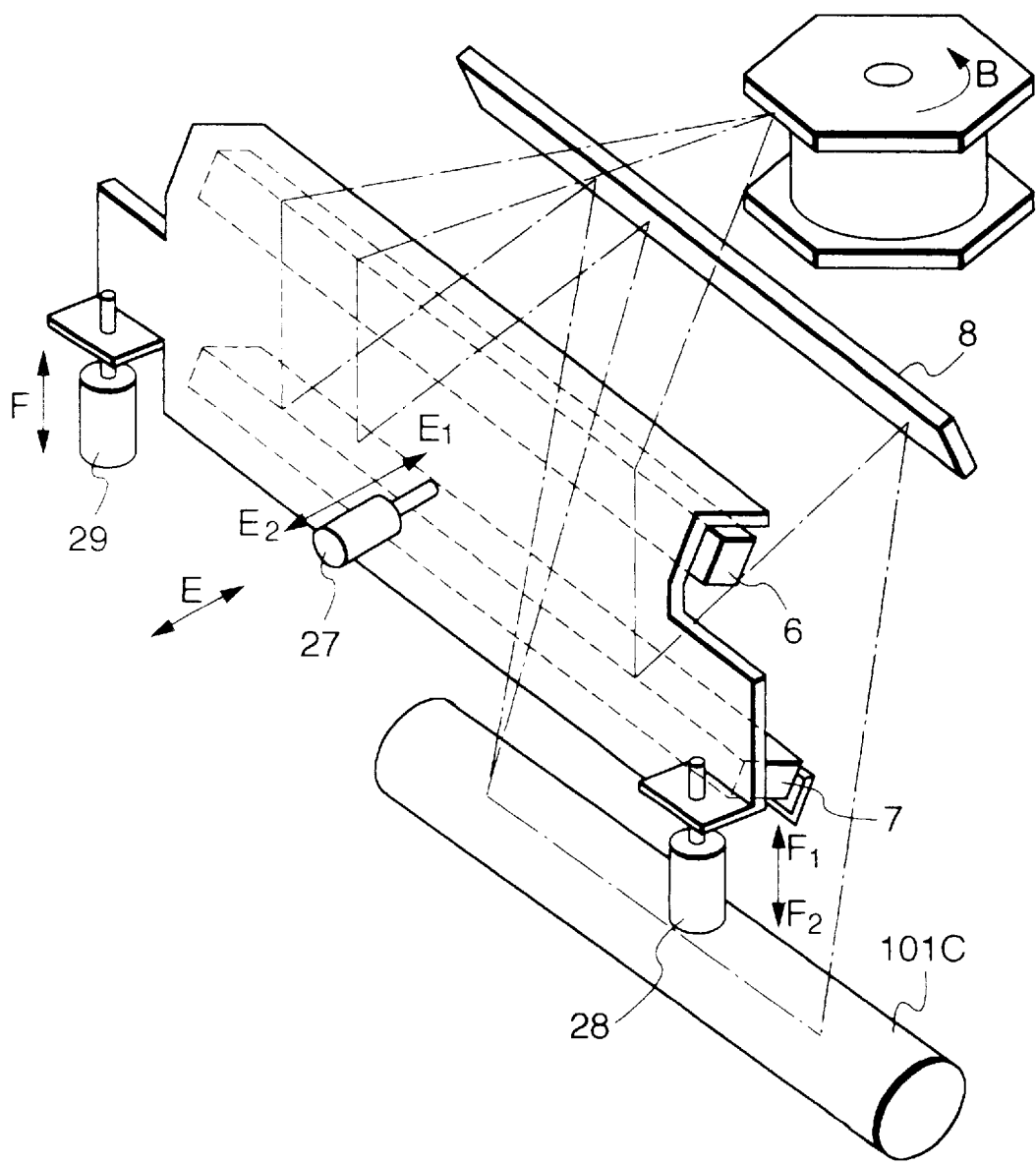
FIG. 10 is a schematic perspective view of a main section for explaining a registration correcting mechanism of such a kind of image forming apparatus.
Figure 11A:
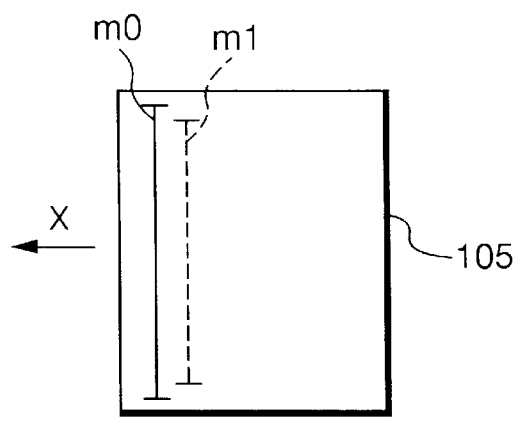
FIGS. 11A to 11C are diagrams for explaining a registration correction state which is corrected by the registration correcting mechanism shown in FIG. 10.
Figure 11B:
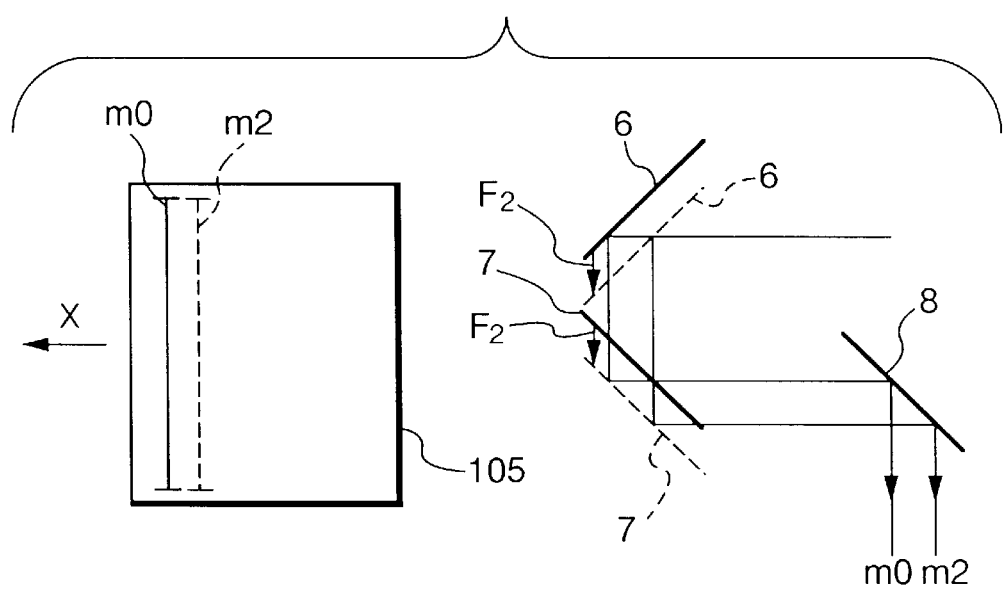
Figure 11C:
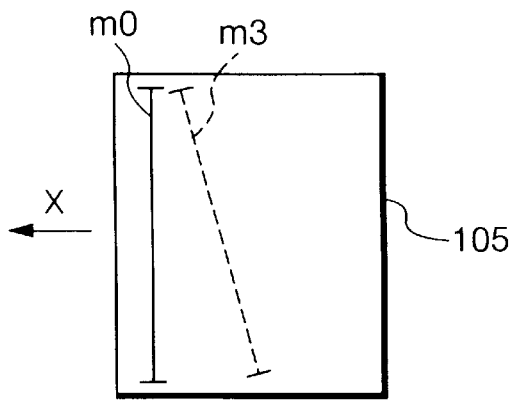

In the embodiment as well, as mentioned above, a position deviation of an image is corrected by using the mechanism shown in FIG. 10.

As mentioned above, as a method whereby a registration mark is formed on a transfer belt and the registration mark is read, thereby calculating a position deviation amount of each image, the method disclosed in U.S. Pat. No. 5,452,073 or U.S. Pat. No. 5,576,753 can be applied.

In the image forming apparatus constructed as mentioned above, as for a temperature difference $\Delta T$ (T2-T1) between the temperatures T1 and T2, although its value is small when the whole apparatus is cool, it is a large value such as $\Delta T = \Delta Tmax$ (about 15 deg) in a state in which the apparatus main body operates and the exposing section and the whole apparatus are thermally expanded by the heat generating sources (mainly polygon mirror driving motor).

Figure 3:
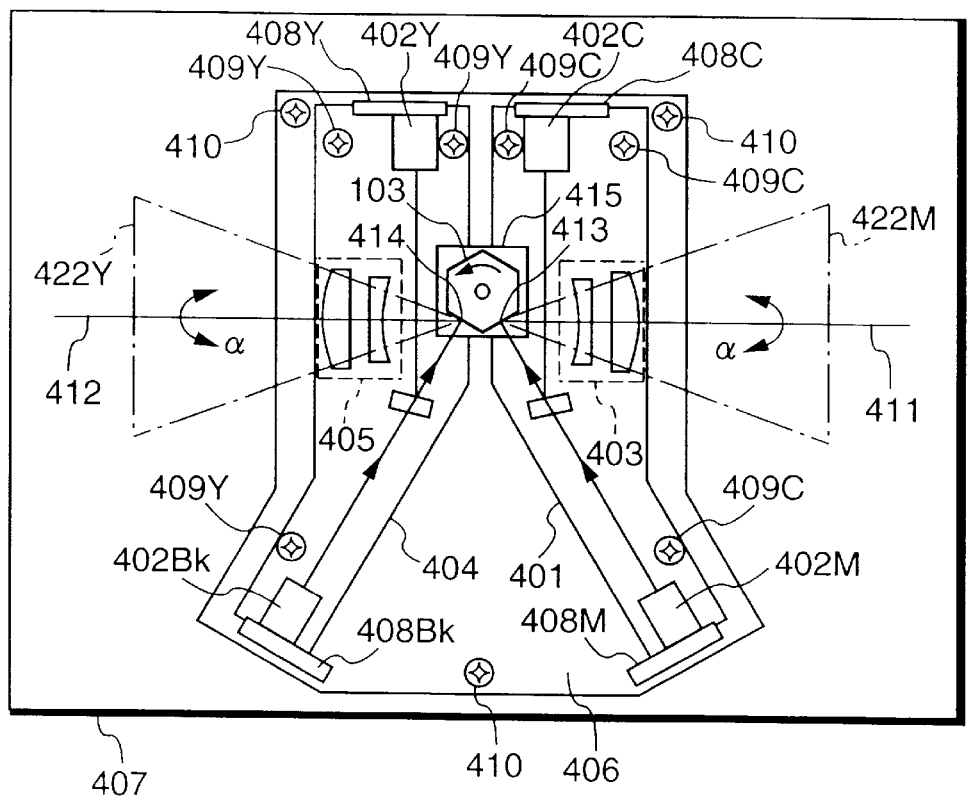
FIG. 3 is a plan view of an exposing section of the image forming apparatus shown in FIG. 1.
Figure 4A:
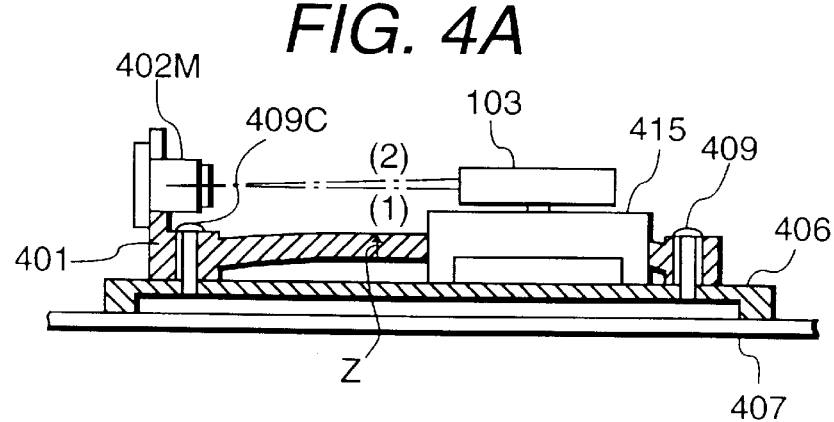
FIGS. 4A and 4B are cross sectional views of a main section for explaining a construction of portions around a rotary polygon mirror shown in FIG. 3.
Figure 4B:
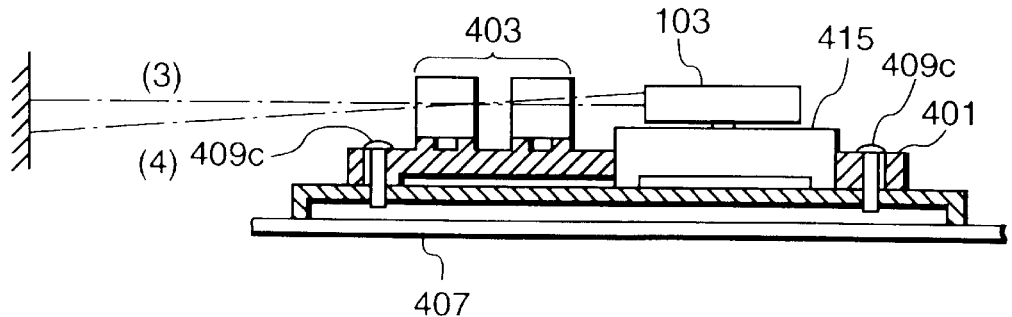

As mentioned above, the various scanning deviation phenomena (the magnification error of a scanning line, inclination deviation, deviation of the top margin, deviation of the left margin) increase in proportion to the temperature difference $\Delta T$. Particularly, the top margin deviation amount is the largest as shown in FIG. 3.

Figure 14:
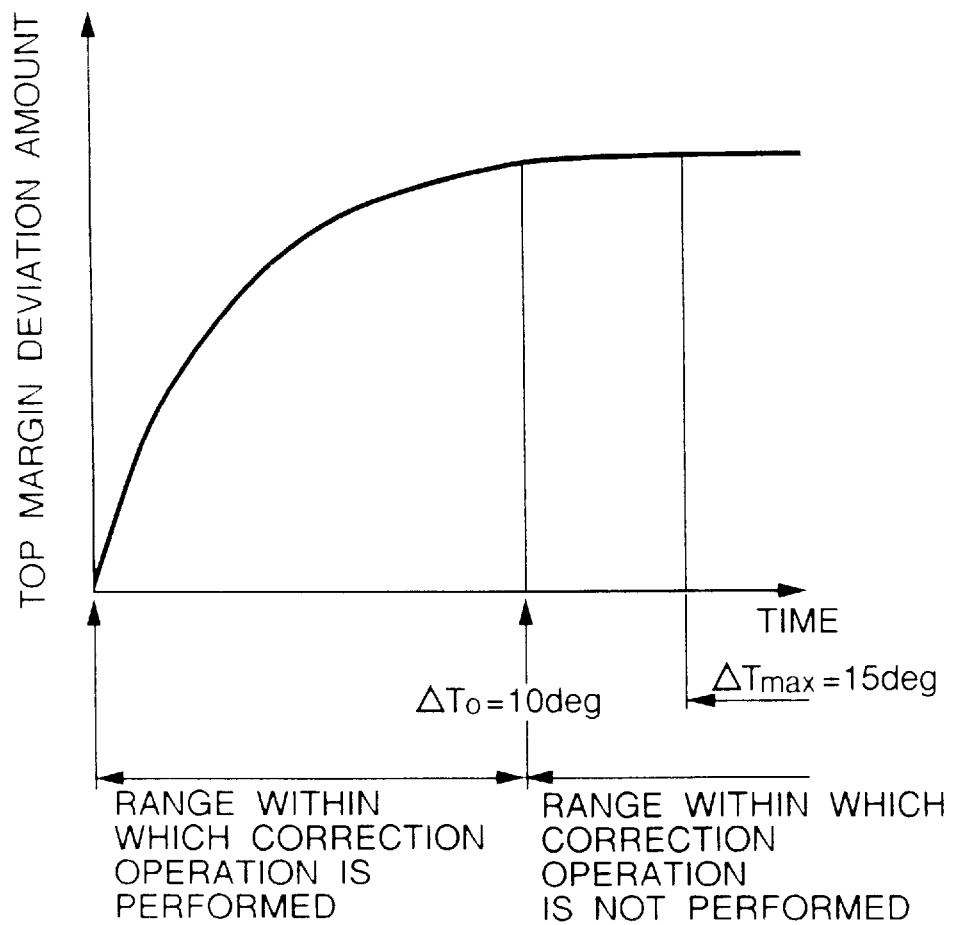
FIG. 14 is a characteristic diagram for explaining a top margin deviation amount based on a temperature difference due to a temperature sensor shown in FIG. 12.

FIG. 14 is a characteristic graph for explaining the top margin deviation amount based on the temperature difference due to the temperature sensor shown in FIG. 12. An axis of ordinate indicates a deviation amount of top margin and an axis of abscissa denotes a time after a power source was turned on.

Figure 6:
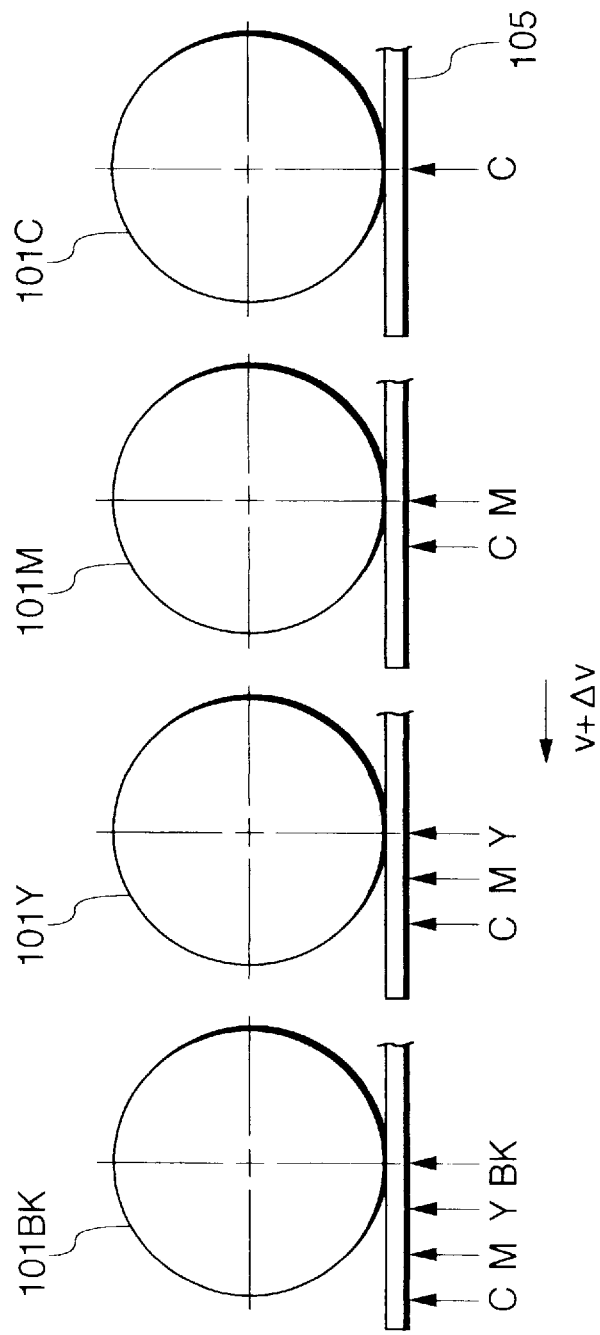
FIG. 6 is a cross sectional view of a main section showing each photosensitive drum shown in FIG. 5 and a deviation of an image transfer position.
Figure 7:
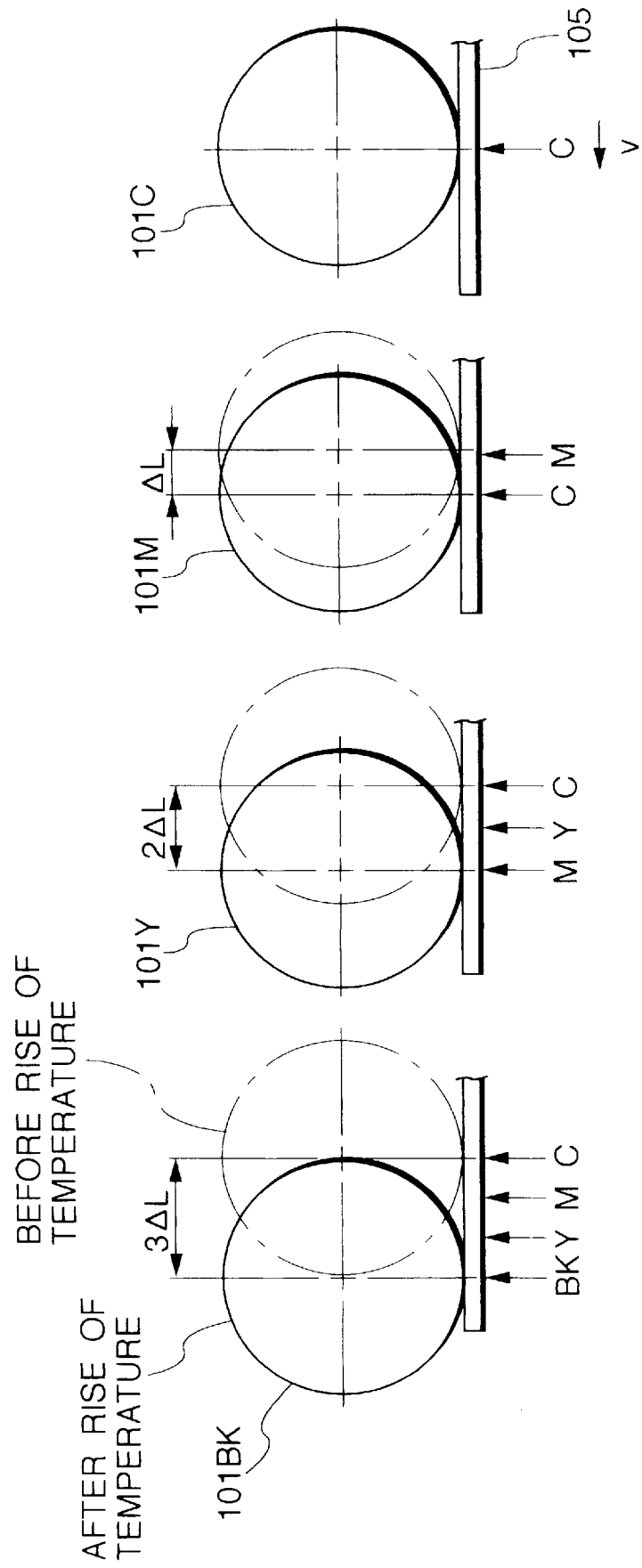
FIG. 7 is a cross sectional view of a main section showing each photosensitive drum shown in FIG. 5 and the deviation of the image transfer position.
Figure 8:
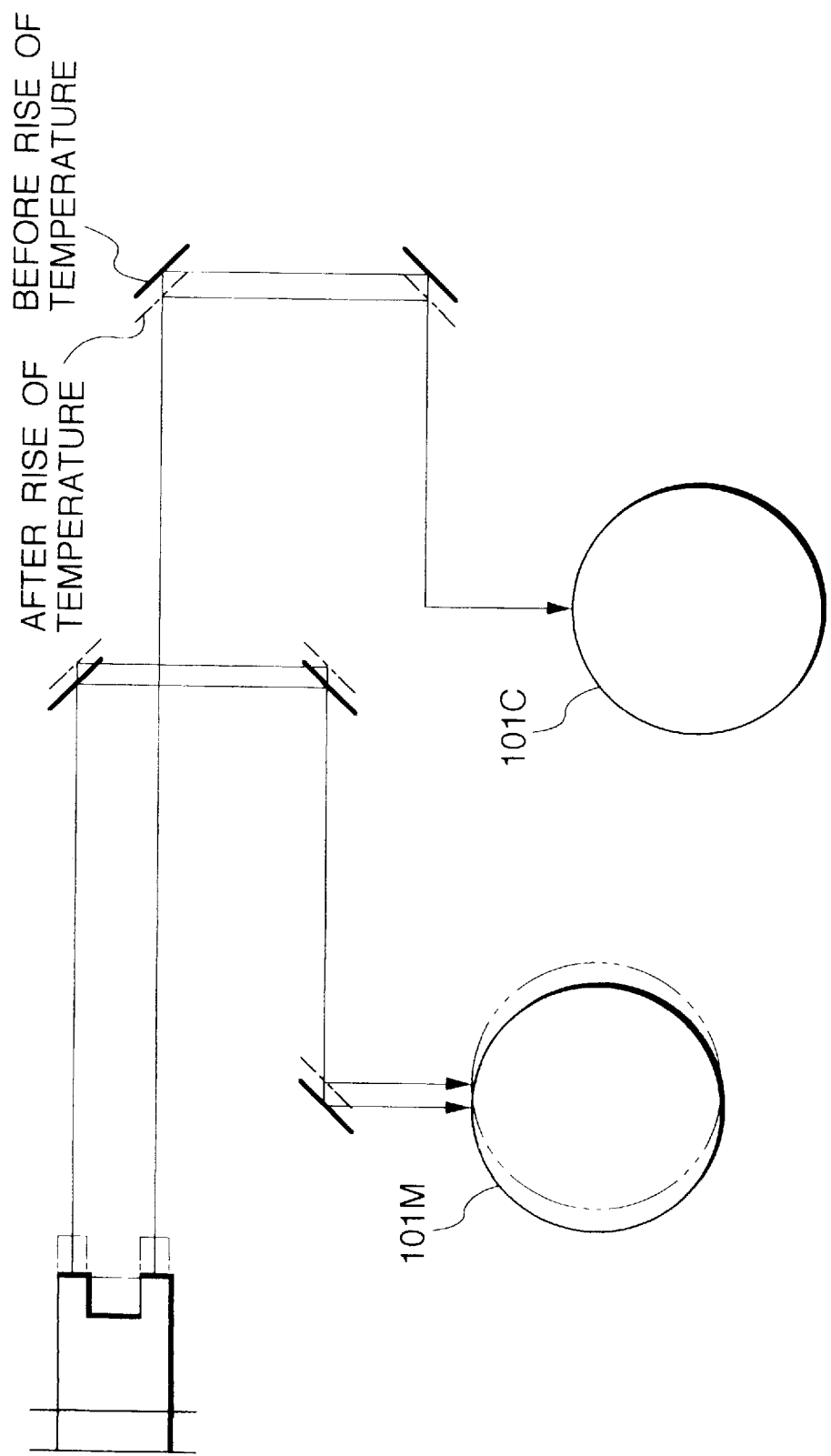
FIG. 8 is a cross sectional view of a main section showing each photosensitive drum shown in FIG. 5 and the deviation of the image transfer position.
Figure 9:
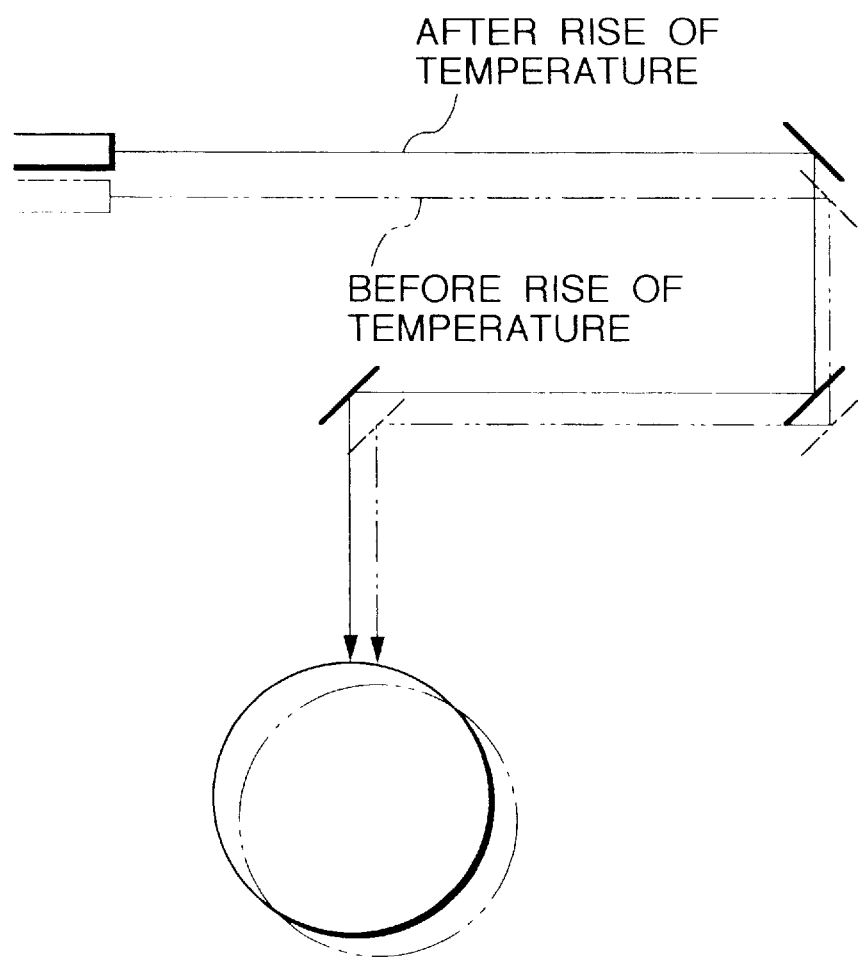
FIG. 9 is a cross sectional view of a main section showing each photosensitive drum shown in FIG. 5 and the deviation of the image transfer position.

As shown in the diagram, when the power source is turned on, the exposing section is heated and by deviating the scanning line as shown in FIG. 6, the top margin is deviated. An increase amount of such a deviation increases when the temperature difference $\Delta T$ is small. The increase amount decreases from a timing just before the temperature difference $\Delta T$ is saturated. Namely, when the temperature difference $\Delta T$ is small, the degree of the deviation of the scanning line is large with the elapse of time and a deterioration of an image quality for the elapse of time is remarkable.

Figure 15:
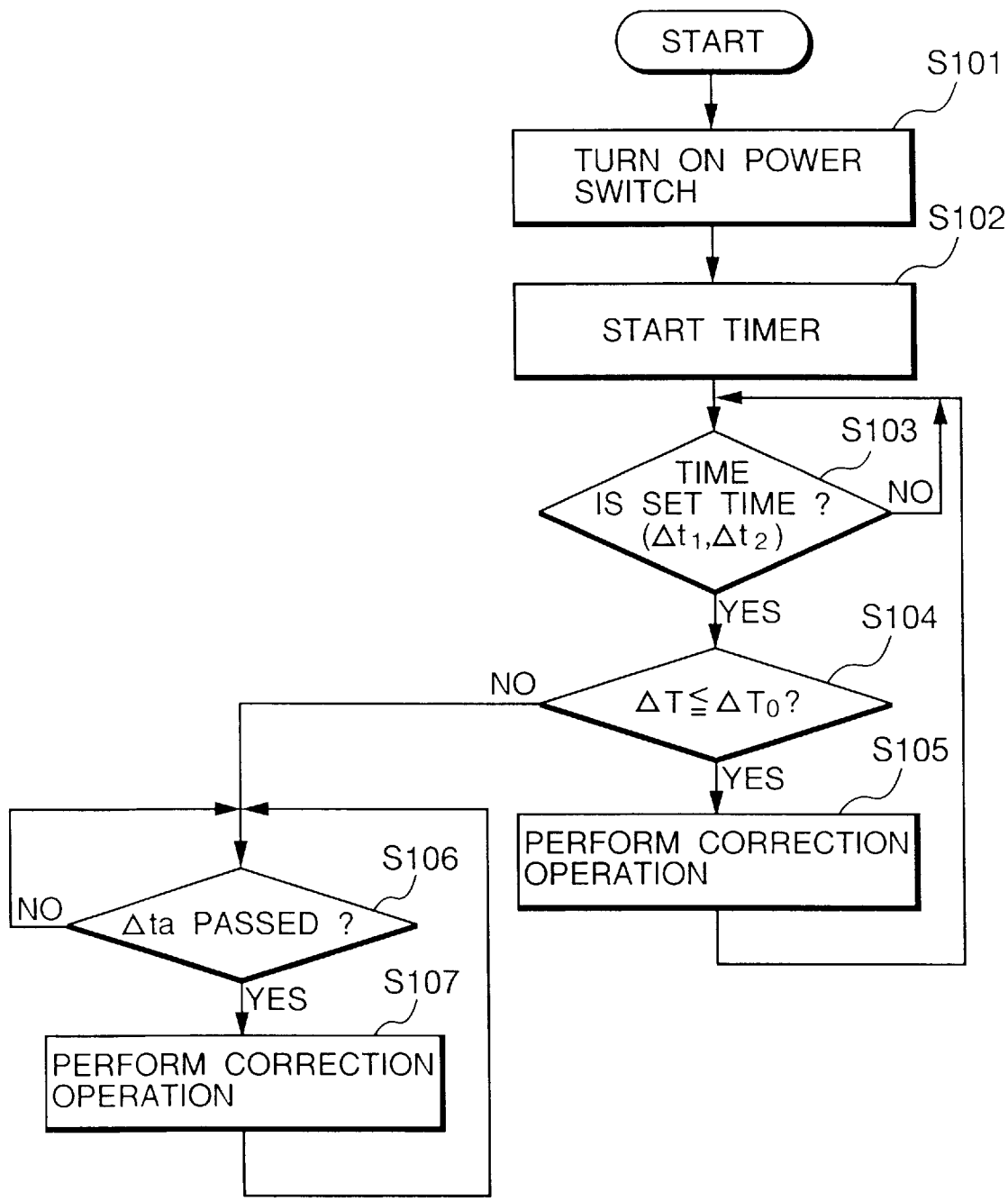
FIG. 15 is a flowchart for explaining a registration correction processing operation in the embodiment of the invention.

In the embodiment, therefore, in consideration of a degree of change of the deviation amount of the image for the elapse of time as mentioned above, a correction operation of the position deviation of the image is executed by the controller section CONT in accordance with a flowchart shown in FIG. 15.

FIG. 15 is the flowchart for explaining a registration correction processing operation of the apparatus of FIG. 12.

The operation of the CPU will now be described hereinbelow with reference to the flowchart of FIG. 15.

First, when the power source is turned on (step S101), a time measurement by an internal timer TM, which is built into the controller section CONT and thus is not shown in FIG. 12, is started (step S102). At a time point when a predetermined time $\Delta t1$ has elapsed (step S103), the temperature difference $\Delta T$ is calculated from the detection results of the temperature sensors SEN1 and SEN2 and a check is made to see if the temperature difference $\Delta T$ is equal to or less than a reference temperature difference $\Delta T0$ (in the embodiment, the reference temperature difference $\Delta T0$ is set to, for example, about 10 deg which is lower than a maximum temperature difference $\Delta Tmax$ by 5 deg) or not (step S104). Thus, when $\Delta T$ is equal to or lower than $\Delta T0$, it is judged that such a time corresponds to a time zone when the degree of the deviation of the scanning line is large as mentioned above. The foregoing correction operation is executed (step S105).

In the embodiment, a reason why the reference temperature difference $\Delta T0$ is set to be lower than $\Delta Tmax$ is to consider a measurement error of the temperature and a variation among the apparatuses. At time points when predetermined times $\Delta t1$, $\Delta t2$, . . . have elapsed, the above operation is repeated. In the embodiment, the predetermined times $\Delta t1$, $\Delta t2$, . . . are set in a manner such that $\Delta t1 = 0$ minute, $\Delta t2 = 10$ minutes, $\Delta t3 = 30$ minutes, $\Delta t4 = 60$ minutes, $\Delta t5 = 90$ minutes, and $\Delta t6 = 120$ minutes. After that, the processes in steps S103 to S105 are repeated every other 120 minutes. This is because just after the power source was turned on, since a time zone when a degree of deviation of the scanning line is large comes, the correction operation is finely executed. When the elapsed time is long, a degree of a change in the deviation amount for the elapse of time is also small, it is sufficient that the number of executing times of the correction operation is small.

On the other hand, when the temperature difference $\Delta T$ is larger than the reference temperature difference $\Delta T0$ ($\Delta T > \Delta T0$), the deviation of the scanning line has already been extinguished and the correction operation is not executed, so that the apparatus enters a state in which the image forming apparatus main body can be continuously used.

In a state in which the apparatus is sufficiently warmed (state in which there is no deviation of the scanning line), in the case where a power switch is turned off and is subsequently turned on again, namely, in the case where a time from the turn-off to the turn-on is short, the temperature in the apparatus is such that ΔT>ΔT0 even when Δt1=0, there is no scanning deviation, and the correction operation is not executed. Therefore, the image forming apparatus is in a state in which it can be soon used in a good state.

When the time from the turn-off of the power switch to the turn-on is long, there is a situation such that the temperature in the apparatus also decreases and ΔT<ΔT0. In this instance, although the scanning line is deviated, since the above processes in steps S104 and S105 and the correction operation is executed, the deviation of the scanning line is extinguished and a good image is derived.

On the other hand, when the judgment result in step S104 is NO, namely, when the temperature difference ΔT is larger than the reference temperature difference ΔT0, the correction operation is executed at every predetermined interval $t_a$ (120 minutes in the embodiment) (step S107) and a slight deviation of the scanning line can be also corrected. As mentioned above, in the embodiment, the difference between the outputs of the sensors is detected in accordance with the elapse of the predetermined time and whether the correction operation is executed or not is decided on the basis of such a difference. Therefore, the number of executing times of the registration correction operation can be reduced to the necessary minimum limit.

A good image, therefore, can be continuously formed.

Another embodiment of the invention will now be described.

Figure 16:
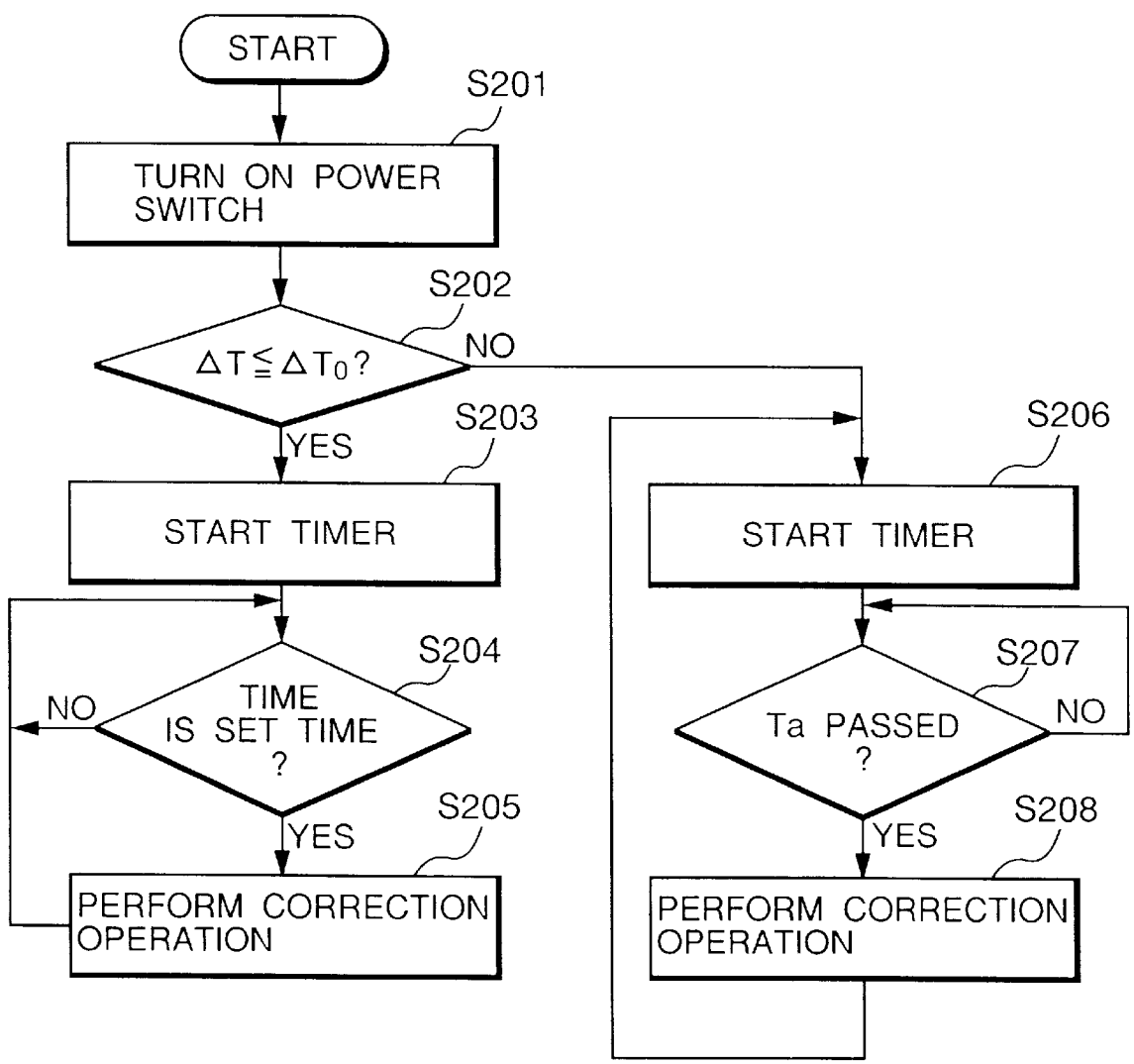
FIG. 16 is a flowchart for explaining another operation of the registration correcting process of the image forming apparatus according to the invention.

FIG. 16 is a flowchart for explaining the operation of the controller section in the embodiment.

First, when the power source is turned on (step S201), the temperature difference ΔT is calculated from the measurement data detected by the temperature sensors SEN1 and SEN2. A check is made to see if the temperature difference ΔT is equal to or lower than the reference temperature difference ΔT0 or not (step S202). Even in the embodiment, the reference temperature difference ΔT0 is set to a value which is lower than the maximum temperature difference ΔTmax by 5 deg, for example, about 10 deg which is lower than ΔTmax=15 deg by 5 deg in FIG. 14. The reference temperature difference ΔT0 can be properly changed in accordance with an internal temperature situation that is peculiar to each apparatus.

When ΔT is equal to or less than ΔT0, as mentioned above, it is considered that a degree of the change of the position deviation amount of the image for the elapse of time after that is large. When ΔT is larger than ΔT0, it is considered that the degree of such a change is small.

In the embodiment, therefore, the temperature difference ΔT is measured, for example, during the warming-up operation of the apparatus after the power source was turned on. When the temperature difference is small, the correction operation is finely executed.

That is, in step S202, when ΔT is equal to or lower than ΔT0, the time measuring operation by the timer is started (step S203). At a time point when a predetermined time has elapsed (step S204), the position deviation amount between the images which are formed by the respective image forming stations is calculated as mentioned above and the correction operation of the position deviation is executed (step S205).

The above operation is repeated at the time points when the predetermined times Δt1, Δt2, . . . have elapsed as mentioned above. In the embodiment as well, the predetermined times Δt1, Δt2, . . . are set in a manner such that Δt1=0 minute, Δt2=10 minutes, Δt3=30 minutes, Δt4=60 minutes, Δt5=90 minutes, and Δt6=120 minutes. After that, the processes in steps S204 and S205 are repeated at every other 120 minutes. That is, just after the power source was turned on, when ΔT is equal to or lower than ΔT0, a degree of the change in the deviation amount of the scanning line is large for the elapse of time, so that the correction operation is finely executed. When the elapsed time is long, the degree of change in the deviation amount for the elapse of time is small, so that it is sufficient to execute the number of executing times of the correction operation.

In the case where the temperature difference ΔT is larger than the reference temperature difference ΔT0, the deviation of the scanning line has already been extinguished by the correction operation before it and the correction operation is not executed. Therefore, the apparatus is in a state in which the image forming apparatus main body can be continuously used.

Namely, a good image without a position deviation can be continuously formed.

When ΔT is larger than ΔT0 in step S202, the time measuring operation is started by the timer (step S206). After the elapse of the predetermined time interval $t_a$ (in the embodiment as well, $t_a$=120 minutes) (step S207), the foregoing correction operation is executed.

Namely, for instance, as mentioned above, in the case where in a state in which the apparatus is sufficiently warmed (state in which there is no deviation of the scanning line), the power switch is turned off and is subsequently again turned on, the temperature in the apparatus is set such that ΔT>ΔT0 even at Δt1=0.

In this case, since it is considered that a degree of the change in the position deviation amount of the scanning line for the elapse of time is small, after the power source was turned on, the processes in steps S206 to S208 are repeated. The correction operation is executed at an interval that is relatively longer than that in the sequence in steps S204 and S205. Thus, even a slight deviation of the scanning line can be also corrected and it is possible to prevent that the ordinary image forming sequence is frequently interrupted by the position deviation correcting sequence.

Therefore, a good image can be continuously formed.

In the case where the time from the turn-off of the power switch to the turn-on is long as mentioned above, there is a case where the temperature in the apparatus also decreases and ΔT<ΔT0. However, such a temperature reduction is detected in step S202 and the processes in steps S204 and S205 are repeated and the correction operation is executed as mentioned above, so that the deviation of the scanning line is extinguished and a good image is derived.

The time interval $t_a$ can be set to a predetermined interval or can be also changed.

It is also possible to control in a manner such that after the temperature relation of ΔT>ΔT0 was obtained in step S205, when ΔT is increased by only a certain amount ΔTa irrespective of the time measured by the timer, a start signal to execute the correction operation is transmitted. In this instance, the certain amount ΔTa can be set to a predetermined amount or can be also changed.

As described above, a temperature difference between the temperature of a portion near the heat generating source and the temperature of a portion which is not influenced by the heat generating source is compared with a predetermined threshold value temperature. The registration correction operation is controlled by the comparison result. Therefore, the deviation of the scanning line which is maximum in the case where the temperature difference is equal to or lower than the predetermined threshold value temperature is certainly corrected. When the derived temperature difference exceeds the predetermined threshold value temperature, the unnecessary correction operation of the deviation of the scanning line can be stopped. A good image can be continuously formed.

By detecting the temperature difference at a predetermined measured time, when the temperature difference is equal to or higher than the predetermined threshold value temperature, the deviation of the scanning line is corrected at every predetermined time interval without performing an excessive correction of the deviation of the scanning line. An image formation can be continuously executed.

Further, just after the power source was turned on, when the temperature difference exceeds the predetermined threshold value temperature, the correction operation is executed at every elapse of the predetermined time. Therefore, when the temperature difference exceeds the predetermined threshold value temperature after the power source was turned on, the unnecessary correction of the scanning line deviation is stopped and the image formation can be continuously executed.

Namely, the temperature difference just after the turn-on of the power switch is compared with a predetermined reference value. When the measured temperature difference is smaller as a comparison result, the correction operation is executed at a relatively short time interval. When the temperature difference just after the turn-on of the power switch is larger than the reference value, the correction operation is executed at a relatively long time interval.

Therefore, the position deviation can be always corrected at the optimum timing. The number of executing times of the correction operation of the position deviation can be set to the minimum necessary value.

May widely different embodiments of the present invention may be constructed without departing from the spirit and scope of the present invention. It should be understood that the present invention is not limited to the specific embodiments described in the specification, except as defined in the appended claims.

What is claimed is:

1. An image forming apparatus comprising:
   (a) image forming means which has an image holding member and forms an image onto a recording medium;
   (b) exposing means for exposing said image holding member;
   (c) correcting means for correcting a position of the image which is formed onto said recording medium by said image forming means;
   (d) first detecting means for detecting a temperature of a portion near said exposing means;
   (e) second detecting means for detecting a temperature in said apparatus other than said exposing means; and
   (f) control means for controlling a correction operation of said correcting means in accordance with outputs of said first and second detecting means.

2. An apparatus according to claim 1, wherein said control means has arithmetic operating means for obtaining a difference between the outputs of said first and second detecting means and comparing means for comparing said difference and a predetermined reference value and controls said correction operation in accordance with said comparison result.

3. An apparatus according to claim 2, wherein said control means decides whether said correction operation is executed or not in accordance with said comparison result.

4. An apparatus according to claim 3, wherein said control means executes said correction operation in the case where said difference is equal to or less than said reference value and makes said correction operation inoperative when said difference is larger than said reference value.

5. An apparatus according to claim 1, wherein
   said control means includes arithmetic operating means for obtaining a difference between the outputs of said first and second detecting means and comparing means for comparing said difference and a predetermined reference value, and
   said apparatus has a first mode for executing said arithmetic operation and said comparing operation at a predetermined interval which sequentially changes and for performing said correction operation in accordance with said comparison result and a second mode for executing said correction operation at every predetermined time.

6. An apparatus according to claim 5, wherein said control means further switches operation of said apparatus between said first and second modes in accordance with the comparison result by said comparing means just after a power source was turned on.

7. An apparatus according to claim 1, wherein said image forming means has a plurality of image forming units each of which has an image holding member and which form images of different colors onto said recording medium, and said correcting means corrects position deviations among the images which are formed by said plurality of image forming units.

8. An apparatus according to claim 1, wherein said control means has arithmetic operating means for obtaining a difference between the outputs of said first and second detecting means and controls said correction operation in accordance with a change amount of said difference.

9. An apparatus according to claim 8, wherein said control means controls said correcting means so as to execute said correction operation in accordance with that said difference was changed by a predetermined amount.

10. An apparatus according to claim 1, wherein said apparatus has a first mode for executing said correction operation at a predetermined interval which sequentially changes and a second mode for executing said correction operation at every predetermined time, and
    said control means further switches operation of said apparatus between said first and second modes on the basis of a difference between the outputs of said first and second detecting means just after a power source was turned on.

11. An image forming apparatus comprising:
    (a) image forming means which has a photosensitive drum and forms an image by transferring an image on said photosensitive drum onto a recording medium;
    (b) exposing means for irradiating a laser beam onto said photosensitive drum;
    (c) a first sensor for measuring a temperature of a portion near said exposing means;
    (d) a second sensor for measuring a temperature in said apparatus other than said exposing means;
    (e) correcting means for correcting a position of the image which is formed by said image forming means; and
    (f) a controller for deciding whether a correction operation by said correcting means is executed or not in accordance with outputs of said first and second sensors.

12. An apparatus according to claim 11, wherein
said image forming means includes a plurality of image forming units each of which has a photosensitive drum and which sequentially transfer images of different colors onto said recording medium which is placed onto a conveying belt and is conveyed, and
said correcting means corrects position deviations among the images which are formed by said plurality of image forming units.

13. An apparatus according to claim 11, wherein said correcting means has a first mode for executing said correction operation at a predetermined interval which sequentially changes and a second mode for executing said correction operation at every predetermined time.

14. An apparatus according to claim 13, wherein said controller sets said correcting means in one of the first and second modes in accordance with the outputs of said first and second sensors.

15. An apparatus according to claim 13, wherein said controller sets said correcting means in one of the first and second modes in accordance with a difference between the outputs of said first and second sensors just after a power source was turned on.

16. An image forming apparatus, comprising:
(a) image forming means having a plurality of image forming units each of which forms a respective image onto a recording medium;
(b) detecting means for detecting, in a detection operation, a positional deviation between the images formed by the plurality of image forming units onto the recording medium; and
(c) correcting means for correcting, in a correction operation, the positional deviation detected by said detecting means,
wherein said apparatus has a first mode in which said detection operation and said correction operation are automatically executed at a predetermined interval which sequentially changes and a second mode in which said detection operation and said correction operation are automatically executed at every predetermined time.

17. An apparatus according to claim 16, further comprising:
exposing means for exposing an image holding member in said image forming means;
first detecting means for detecting a temperature of a portion near said exposing means;
second detecting means for detecting a temperature in said apparatus other than said exposing means; and
control means for setting a mode of said correcting means in accordance with outputs of said first and second detecting means.

18. An apparatus according to claim 17, wherein said control means has means for obtaining a difference between the outputs of said first and second detecting means and sets said mode on the basis of said difference.

19. An image forming apparatus, comprising:
(a) a plurality of image forming units each of which forms a respective image onto a recording medium;
(b) positional deviation detecting means for detecting a positional deviation between the images formed by said plurality of image forming units; and
(c) correcting means for correcting the positional deviation between the images formed by said plurality of image forming units according to the detected result of said positional deviation detecting means,
wherein said apparatus has a registration correcting sequence in which said detecting means detects the positional deviation and said correcting means corrects the positional deviation between the images formed by said plurality of image forming units, and
wherein said apparatus has a first mode for executing said registration correcting sequence at a predetermined interval which sequentially changes and a second mode for executing said registration correcting sequence at every predetermined time.

20. An apparatus according to claim 19, wherein said detecting means detects the positional deviation by reading registration marks formed by the plurality of image forming units and transferred onto a moving member which moves so as to transfer the images formed by the plurality of image forming units.

21. An apparatus according to claim 19, wherein each of the plurality of image forming units has a reflecting mirror for reflecting a laser beam onto the image holding member, and wherein said correcting means moves a position of each of the reflecting mirrors of the plurality of image forming units to correct the positional deviation according to the detection result of said positional deviation detecting means.

22. An apparatus according to claim 19, further comprising exposing means for exposing each of the image holding members of the plurality of image forming units;
first temperature detecting means for detecting a temperature of a position near said exposing means; and
mode setting means for setting said apparatus to one of the first and second modes according to the detection result of said first temperature detecting means.

23. An apparatus according to claim 22, further comprising second temperature detecting means for detecting a temperature in the apparatus at a position other than said exposing means, said mode setting means setting the apparatus according to the detection results of said first and second temperature detecting means.

24. An apparatus according to claim 23, wherein said mode setting means sets said apparatus to the first mode when a difference between the detection results of said first and second temperature detecting means is not larger than a reference value and to the second mode when the difference is larger than the reference value.

25. An image forming apparatus, comprising:
(a) a plurality of image forming units each of which forms a respective image on a recording medium; and
(b) positional deviation detecting means for detecting, in a detecting operation, a positional deviation between the images formed by the plurality of image forming units,
wherein said apparatus has a first mode in which the detecting operation of said detecting means is automatically executed at a predetermined interval which sequentially changes and a second mode in which the detecting operation is automatically executed at every predetermined time.

26. An apparatus according to claim 25, further comprising exposing means for exposing each of the image holding members of the plurality of image forming units;
first temperature detecting means for detecting a temperature of a position near said exposing means; and
mode setting means for setting said apparatus to one of the first and second modes according to the detection result of said first temperature detecting means.

27. An apparatus according to claim 26, further comprising second temperature detecting means for detecting a temperature in said apparatus at a position other than said exposing means, said mode setting means setting said apparatus to one of the first and second modes according to the detection results of said first and second temperature detecting means.

28. An apparatus according to claim 27, wherein said mode setting means sets the apparatus to the first mode when a difference between the detection results of said first and second temperature detecting means is not larger than a reference value and to the second mode when the difference is larger than the reference value.

29. A controller used with an image forming apparatus in which respective images are formed on a recording medium by exposing respective image holding members of each of a plurality of image forming units using an exposing unit and in which a difference between positions of the images respectively formed by said plurality of image forming units is detected, in a detection operation, to correct said difference in a correction operation, said controller controlling the detection operation and the correction operation based upon a temperature at a first position near said exposing unit and a temperature at a second position in said apparatus different from the first position.

30. An image forming apparatus, comprising:
   (a) a plurality of image forming units each of which forms a respective image onto a recording medium;
   (b) detecting means for detecting, in a detection operation, a positional deviation between the images formed by the plurality of image forming units onto the recording medium; and
   (c) control means for correcting, in a correction operation, the positional deviation according to the detected result of said detecting means, said control means controlling said detection operation of said detecting means and said correction operation so that both said detection operation and said correction operation are each automatically executed at a predetermined interval which gradually changes.

31. An apparatus according to claim 30, wherein said detecting means detects the positional deviation by reading registration marks formed by the plurality of image forming units and transferred onto a moving member which moves so as to transfer the images formed by the plurality of image forming units.

32. An apparatus according to claim 31, wherein each of the plurality of image forming units has a reflecting mirror for reflecting a laser beam onto the image holding member, and wherein said correcting means moves a position of each of the reflecting mirrors of the plurality of image forming units to correct the positional deviation according to the detection result of said positional deviation detecting means.

33. An image forming apparatus, comprising:
   (a) a plurality of image forming units each of which forms a respective image onto a recording medium;
   (b) detecting means for detecting, in a detection operation, a positional deviation between the image formed by the plurality of image forming units onto the recording medium;
   (c) correcting means for correcting, in a correction operation, the positional deviation according to the detected result of said detecting means,
   wherein said apparatus has a registration correcting sequence in which said detection means detects the positional deviation and said correction means corrects the positional deviation, and wherein said registration correction sequence is executed at an interval which gradually changes.

34. An apparatus according to claim 33, wherein said detecting means detects the positional deviation by reading registration marks formed by the plurality of image forming units and transferred onto a moving member which moves so as to transfer the image formed by the plurality of image forming units.

35. An apparatus according to claim 34, wherein each of the plurality of image forming units has a reflecting mirror for reflecting a laser beam onto the image holding member, and wherein said correcting means moves a position of each of the reflecting mirrors of the plurality of image forming units to correct the positional deviation according to the detection result of said positional deviation detecting means.

36. An apparatus according to claim 33, wherein said interval is sequentially changed so that said registration correcting sequence is executed at an interval which becomes longer gradually.

* * * * *

UNITED STATES PATENT AND TRADEMARK OFFICE
CERTIFICATE OF CORRECTION

PATENT NO. : 5,828,925
DATED : October 27, 1998
INVENTOR(S) : ATSUTOMO YOSHIZAWA It is certified that error appears in the above-identified patent and that said Letters Patent is hereby corrected as shown below:

<u>COLUMN 5</u>

Line 17, "10C, 101M;" should read --101C, 101M,--;
    Line 28, "10M, 110Y," should read --101M, 101Y,--; and
    Line 31, "10M," should read --101M,--.

Signed and Sealed this

Sixth Day of July, 1999

*Attest:*

Q. TODD DICKINSON

*Attesting Officer*     Acting Commissioner of Patents and Trademarks